Aug. 7, 1956
R. D. AMSDEN
2,758,260
BLOCKING RECTIFIER CIRCUIT
Filed May 2, 1952
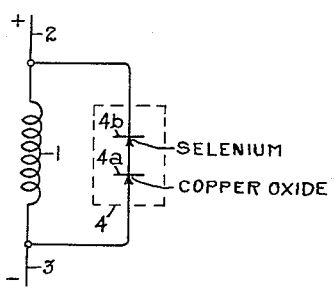
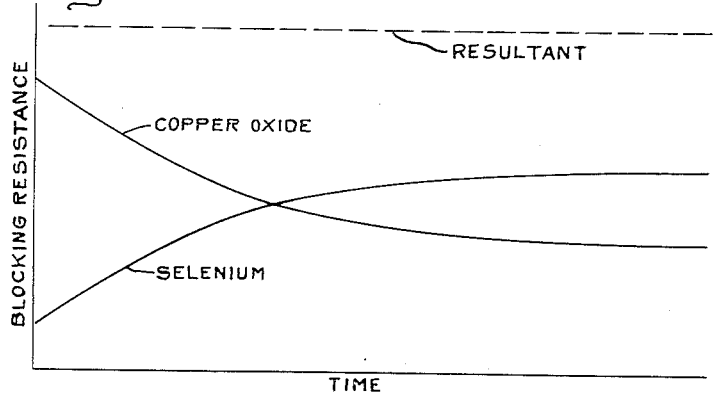
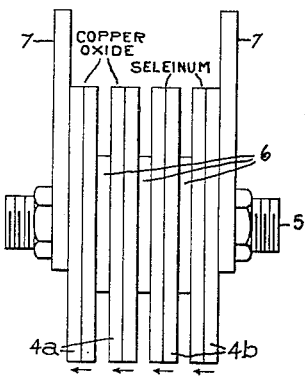
Inventor:
Ralph D. Amsden,
by [signature]
His Attorney.

2,758,260

BLOCKING RECTIFIER CIRCUIT

Ralph D. Amsden, Lynn, Mass., assignor to General Electric Company, a corporation of New York Application May 2, 1952, Serial No. 285,763

2 Claims. (Cl. 317—234)

My invention relates to blocking rectifier circuits, and more particularly to blocking rectifier circuits utilizing metallic plate rectifiers of the contact type.

In the past, difficulties have been encountered with both copper oxide and selenium rectifiers when either is used in a direct current circuit as a blocking rectifier, due to the fact that the reverse resistance of each rectifier plate or element changes rapidly when first put into the circuit. This is a manifestation of the well known aging characteristics of contact plate rectifiers and, in the case of both selenium and copper oxide, it results in an appreciable change in blocking or reverse resistance between the initial and the stabilized resistance values. I have noted, however, that while the reverse resistance of both copper oxide rectifier plates and selenium rectifier plates changes considerably during the aging period, the stabilized value of reverse resistance in the case of a copper oxide plate is lower than its initial value, while the stabilized reversed resistance value of a selenium plate is higher than its initial value.

Accordingly, therefore, it is a principal object of my invention to provide a new and improved blocking rectifier of the contact type in which the reverse or blocking resistance does not change appreciably as a result of aging of the plates.

It is another object of my invention to provide a new and improved blocking rectifier of the contact plate type in which the reverse or blocking resistance remains substantially fixed at all times.

In carrying out my invention in one form, I connect in series circuit relation in a direct current circuit a plurality of rectifier plates or elements, at least one of which is a rectifier plate of the copper oxide type and at least one of which is a rectifier plate of the selenium type. Preferably, of course, these copper oxide and selenium elements or plates are assembled in a single stack and are so oriented that their reverse resistances are in aiding series circuit relation between the stack terminals.

My invention itself will be more fully understood and its various objects and advantages further appreciated by referring now to the following detailed specification taken in conjunction with the accompanying drawing in which Fig. 1 is a schematic circuit diagram of an electric circuit including a blocking rectifier embodying my invention; Fig. 2 is a graphical representation of typical reverse aging characteristics of copper oxide and selenium rectifier elements or plates; and Fig. 3 is a side elevational view of a rectifier stack or assembly built in accordance with my invention and suitable for use in the circuit of Fig. 1.

Referring now to the drawing, I have shown at Fig. 1 a typical direct current circuit utilizing rectifiers in the blocking sense. The circuit shown at Fig. 1 by way of illustration is a typical circuit for a time delay dropout relay, and includes a relay energizing winding 1 connected between positive and negative unidirectional supply lines 2 and 3 respectively and having connected in parallel circuit relation therewith a rectifier 4 disposed in the blocking direction. In accordance with my invention, the rectifier 4 comprises a section 4a formed of copper oxide rectifier plates connected in aiding series circuit relation with a section 4b composed of selenium rectifier plates. It will be understood by those skilled in the art that in operation substantially no current is conducted through the rectifiers so long as the relay winding 1 is connected to the direct current supply source, but that upon disconnection of the relay from the source the inductive energy stored in the relay winding is dissipated in a circulating current connected through the winding and the rectifiers thereby to maintain the relay picked up for a certain time delay interval following disconnection of the relay from the source.

At Fig. 2 I have shown a graphical representation of typical reverse resistance aging characteristics for selenium and copper oxide rectifier elements. It will be observed that copper oxide elements stabilize at a reverse resistance lower than their initial resistance, while selenium rectifier elements stabilize at a reverse resistance higher than their initial resistance. It will therefore be evident to one skilled in the art that by connecting copper oxide elements in aiding series circuit relation with selenium elements, the resultant reverse resistance characteristic will be different from the varying characteristics shown. Such resultant characteristic may, by suitable proportioning of copper oxide elements and selenium elements, be arranged to remain substantially fixed at all times. It will, of course, be appreciated by those skilled in the art that the resultant reverse resistance may be controlled by varying the proportion of copper oxide to selenium elements in the series circuit, but such proportioning may readily be so carried out by one skilled in the art that the resultant resistance will remain substantially constant over the operating life.

At Fig. 3 I have shown a typical assembly of contact rectifier elements for plates adapted for use as a blocking rectifier in accordance with my invention. This assembly comprises a pair of copper oxide rectifier plates 4a and a pair of selenium rectifier plates 4b stacked in parallel spaced relation upon an insulated bolt 5 and spaced apart by contact spacers 6. The assembly is provided at its ends with terminal connectors 7 and the individual rectifier elements are so oriented that their reverse resistances are in aiding series circuit relation as indicated by the arrows at Fig. 3. It will, of course, be further understood by those skilled in the art that a blocking rectifier circuit embodying my invention need not necessarily have the copper oxide and selenium elements assembled in a single unitary stack, but that separate stacks may be provided and electrically connected in series circuit relation.

While I have described only certain preferred embodiments of my invention by way of illustration, many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. A blocking rectifier having a reverse resistance which remains substantially constant with aging, said rectifier comprising at least one element of the copper oxide type and at least one element of the selenium type connected with their reverse resistances in aiding series circuit relation, the number of said elements in said rectifier being proportioned relative to one another to balance the reverse resistance aging characteristic of copper oxide elements against the opposite reverse resistance aging characteristic of selenium elements.

2. A blocking rectifier assembly having a reverse resistance which remains substantially constant with aging, said rectifier assembly comprising at least one rectifier element having a reverse resistance which increases with aging, and at least another independent rectifier element having a reverse resistance which decreases with aging, and means electrically interconnecting said rectifier elements with their reverse resistances in aiding series circuit relationship, the number of said rectifier elements having an increasing reverse resistance being proportioned in relation to the number of said elements having a decreasing reverse resistance such that the sum of the reverse resistances in said assembly remains substantially constant with aging.

References Cited in the file of this patent

UNITED STATES PATENTS

| | | |
|---|---|---|
| 929,582 | Garretson | July 27, 1909 |
| 1,895,684 | Ruben | Jan. 31, 1933 |
| 1,895,685 | Ruben | Jan. 31, 1933 |
| 1,930,519 | Irion | Oct. 17, 1933 |
| 1,949,383 | Weber | Feb. 27, 1934 |
| 1,966,077 | Nyman | July 10, 1934 |
| 2,608,611 | Shive | Aug. 20, 1952 |